United States Patent

Miyata et al.

[11] 4,110,765
[45] Aug. 29, 1978

[54] LIGHT-MEASURING SYSTEMS FOR SINGLE LENS REFLEX CAMERAS

[75] Inventors: Katsuhiko Miyata, Saitama; Fumio Urano, Omiya; Akihiro Arai, Tokyo, all of Japan

[73] Assignee: Asahi Kogaku Kogyo Kabushiki Kaisha, Japan

[21] Appl. No.: 698,469

[22] Filed: Jun. 18, 1976

[30] Foreign Application Priority Data

Jul. 3, 1975 [JP] Japan .................................. 50-82399

[51] Int. Cl.² ............................................. G03B 7/00
[52] U.S. Cl. ..................................................... 354/59
[58] Field of Search .................. 354/23 R, 59, 152, 42, 354/49, 56

[56] References Cited

U.S. PATENT DOCUMENTS 3,699,864  10/1972  Shimomura ........................ 354/23 R
3,872,484  3/1975  Hashimoto et al. .................... 354/59

FOREIGN PATENT DOCUMENTS

G14,808  10/1955  Fed. Rep. of Germany ............. 354/59

OTHER PUBLICATIONS

Modern Photography, "Can 11 SLR Meters All Be Right", Nov. 1969, pp. 106 & 107.

Primary Examiner—L. T. Hix
Assistant Examiner—M. L. Gellner
Attorney, Agent, or Firm—Steinberg & Blake

[57] ABSTRACT

A single lens reflex camera has behind its objective a main mirror for reflecting light up to the viewfinder. This main mirror has a semitransparent portion through which part of the light which has traveled through the objective passes. Behind the semitransparent portion of the main mirror is an auxiliary mirror for receiving the light which has passed through the semitransparent portion of the main mirror and for reflecting this light along a predetermined path. A photosensitive device is situated along the latter path to receive the light reflected by the auxiliary mirror and to participate in the measurement thereof. The main mirror has at its semitransparent portion a front surface from which part of the light which has traveled through the objective is reflected up to the viewfinder and a rear surface beyond which part of the light travels to the auxiliary mirror. The auxiliary mirror has a front reflecting surface from which the light is reflected along the predetermined path to the photosensitive element. This rear surface of the main mirror and the front reflecting surface of the auxiliary mirror form a pair of surfaces one of which has the property of diffusing light, so that the photosensitive element receives diffused light.

7 Claims, 4 Drawing Figures

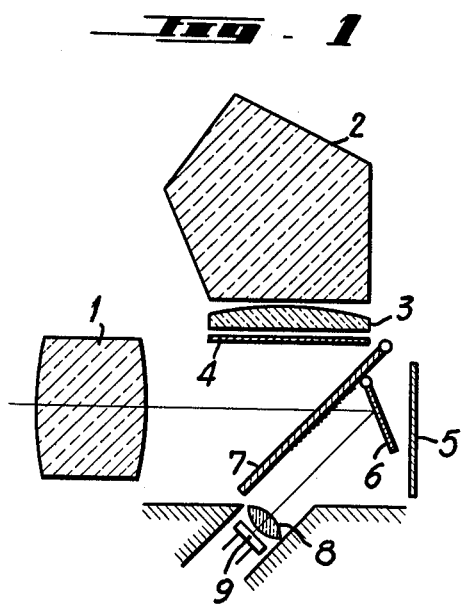
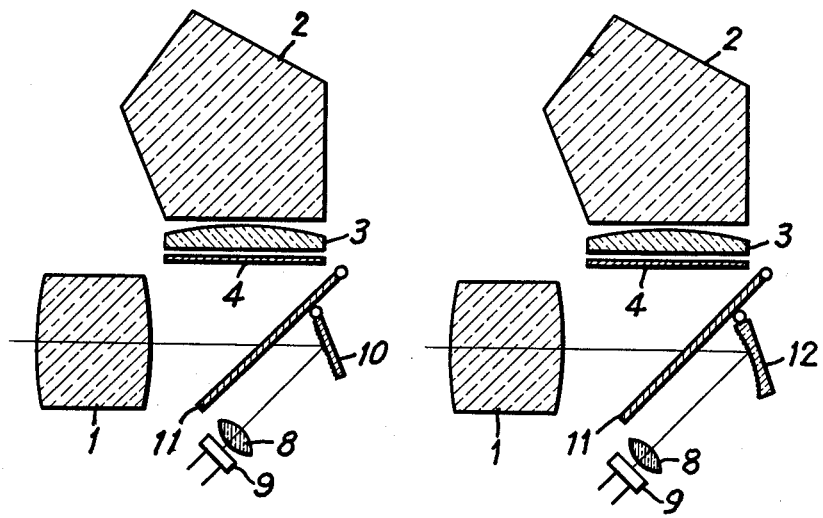

LIGHT-MEASURING SYSTEMS FOR SINGLE LENS REFLEX CAMERAS

BACKGROUND OF THE INVENTION

The present invention relates to cameras.

In particular, the present invention relates to single lens reflex cameras and especially to light-measuring systems thereof.

At the present time it is well known in cameras of this type to direct to the viewfinder and to measure light which has already traveled through the objective of the camera. The present invention relates in particular to this type of camera.

In general, full utility is achieved from a single lens reflex camera by utilizing interchangeable optical systems therewith so that such a camera has a wide range of application. In order to increase the effective use of such cameras it has recently become common to provide such cameras with interchangeable viewfinders as well as with interchangeable objectives, so as to be capable of expanding the range of use of such a camera. However, in connection with interchangeable viewfinders difficulties have been encountered where the light is measured after traveling through the objective because the photosensitive element which receives the light to participate in the measurement thereof is conventionally situated adjacent the pentaprism of the viewfinder. Thus, with cameras of this type along with interchangeable viewfinders it has also been necessary to provide modified light-measuring devices.

Requirements of this latter type have come about because a particular photosensitive element for each of the number of interchangeable viewfinders not only is uneconomical but also deteriorates the reliability of the electrical connection of the photosensitive element. Furthermore, it is required that the light-measuring or photometric characteristics of the interchangeable viewfinders coincide perfectly with each other.

In order to fulfill requirements of this latter type, improvements in the arrangement of the photosensitive element have been attempted such as situating the photosensitive element in the mirror box instead of adjacent the pentaprism. However, changing the location of the light-measuring device in this way is disadvantageous as compared to situating the photosensitive element of the light-measuring device adjacent the pentaprism in that the distribution of light to a photosensitive element situated in a mirror box is extremely uneven depending upon such factors as whether the light-measuring optical system includes particular lenses such as Fresnel lenses or not and particularly as to whether there is a lack of coincidence in the operative association between the diaphragm of one and the same interchangeable lens which is to be used with different types of camera bodies. Disadvantages of this latter type result in the fact that the photosensitive element situated in the mirror box is relatively small and an extremely spot-type of photometering often takes place. With a photographic camera of the automatic exposure type wherein spot photometering is utilized, accurate automatic exposure regulation is not possible unless a memory lock device is additionally provided when the image of the object to be photographed misses (is not received by) the image frame and this memory lock device is operated separately during the photographing operations. In addition, there is a problem in connection with the light-measuring optical system in that there is a possible undesirable influence of light entering through the ocular of the viewfinder. This latter influence should of course be reduced to a minimum. Where the photosensitive element is situated adjacent to the pentaprism, this latter type of undesirable influence is very likely to be encountered, so that this latter factor represents a considerable disadvantage in connection with a type of system where the photosensitive element is adjacent the pentaprism.

SUMMARY OF THE INVENTION

It is accordingly a primary object of the present invention to provide a construction which will avoid the above drawbacks.

In particular, it is an object of the present invention to provide light-measuring systems for single lens reflex cameras of the above type which are particularly suitable for cameras having interchangeable viewfinders.

It is especially an object of the present invention to provide a construction according to which the photosensitive element may indeed be arranged in the mirror box while at the same time avoiding the above light-measuring problems conventionally encountered with constructions of this type where the light which is measured has already traveled through the objective of the camera.

With the structure of the invention an objective means of the camera directs light along the optical axis of the objective means into the interior of the camera to a main mirror means which reflects the received light upwardly to a viewfinder means of the camera. This main reflector means has a semitransparent portion through which part of the light passes after traveling through the objective means, and an auxiliary mirror means is situated behind the semitransparent portion of the main mirror means to receive the light which travels through this semitransparent portion. The auxiliary mirror means reflects the light received thereby along a predetermined path where a photosensitive means is situated to receive this light reflected by the auxiliary mirror means and to participate in the light-measuring operations. The main mirror means has at its semitransparent portion a front surface from which part of the light is reflected upwardly to the viewfinder means and a rear surface beyond which the light which passes through the semitransparent portion travels to the auxiliary mirror means which has a front reflecting surface for reflecting the light along the above path to the photosensitive means. This rear surface of the semitransparent portion of the main mirror means and the front reflecting surface of the auxiliary mirror means form a pair of surfaces one of which has the property of being light-diffusing, so that diffused light is directed along the above predetermined path to the photosensitive means. Thus, by way of providing one surface of the photometric optical system with a diffusing portion the light is diffused thereby and equalized by the diffusing portion so as to be directed in a diffused condition to the photosensitive element, thus effectively solving the above problems.

BRIEF DESCRIPTION OF DRAWINGS

The invention is illustrated by way of example in the accompanying drawings which form part of this application and in which:

FIG. 1 is a schematic partly sectional fragmentary elevation of one embodiment of the invention;

FIG. 2 is a schematic partly sectional elevation of another embodiment of the invention;

FIG. 3 is a schematic partly sectional elevation of a third embodiment of the invention.

DESCRIPTION OF PREFERRED EMBODIMENTS

Figure 4:
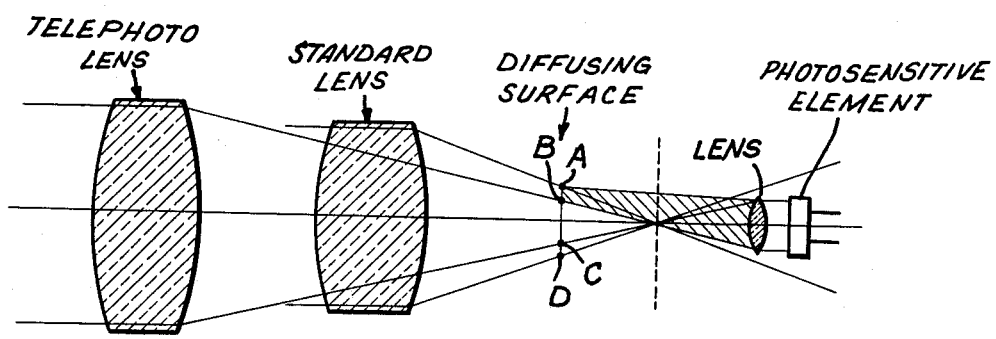
FIG. 4 is a diagrammatic representation of the manner in which the invention operates with different objectives.

Referring now to FIG. 1 there is schematically illustrated therein an objective means 1 of a single lens reflex camera, this objective means 1 directing the light received thereby along the optical axis of the objective means 1 to the main mirror means 7. From the main mirror means 7 the light which has traveled through the objective means 1 is reflected upwardly to the viewfinder means which includes the pentaprism 2 as well as the image glass 3 situated therebeneath and the Fresnel lens 4 situated beneath the image glass 3.

The main mirror means 7 has a semitransparent portion formed, for example, by a semitransmissive film, so that part of the light received by the main mirror means 7 passes through the semitransparent portion thereof to be received by an auxiliary mirror means 6 which is situated behind the semitransparent portion of the main mirror means 7. The light received by the auxiliary mirror means 6 is reflected thereby along a predetermined path to the photosensitive means 9 with participates in the measurement of light in a conventional manner. In accordance with the present invention a surface of the main mirror means 7 or the reflecting surface of the auxiliary mirror means 6 has the property of being light-diffusing. In the embodiment of FIG. 1, the main mirror means 7 has at its semitransparent portion a front surface from which part of the light is reflected upwardly to the viewfinder means and an opposed rear surface beyond which the light travels to the auxiliary mirror means 6, and it is this rear surface of the semitransparent portion of the main mirror means 7 which is light-diffusing in the embodiment of FIG. 1. Thus, the rear surface of the semitransparent portion of the main mirror means 7 is matted or frosted, for example, so as to have the light-diffusing property. This light-diffusing rear surface portion of the main mirror means 7 is indicated by the irregular surface thereof apparent from FIG. 1. The auxiliary mirror means 6 provided for the purpose of light measuring is pivotally carried by the main mirror means 7 at the lower surface thereof in the manner shown schematically in FIG. 1. Thus, a metal sheet which supports the mirror of the mirror means 7 is connected by way of a suitable hinge structure or the like to the auxiliary mirror means 6 which by a suitable spring, for example, is maintained with respect to the mirror 7 in the position shown in FIG. 1 against a suitable stop surface which is not illustrated. When the mirror means 7 turns upwardly about its upper edge to be situated above the optical axis, during exposure of film, situated at the film plane 5 shown in FIG. 1, a mechanism which serves to turn the mirror 7 upwardly also acts on the mirror 6 to turn the latter upwardly with respect to the mirror 7 so as to be situated next to the lower surface thereof. In this way the mirror means 6 will have no influence on light traveling through the objective means 1 to the film plane 5 and at the same time the mirror means 6, which has a rear opaque surface, covers the semitransparent portion of the mirror means 7 when the latter is in the upper exposure position, so as to prevent in this way any light which enters through the viewfinder means from traveling down into the mirror box. Thus, any light which may happen to enter through the ocular of the viewfinder means cannot have access to the space below the mirror 7 during exposure of film.

FIG. 4 schematically illustrates a photometric optical system utilized with the embodiment of FIG. 1, as well as with the other embodiments described below, FIG. 4 in particular providing a comparison of the paths traveled by light in the form of incident light beams (parallel light beams) from a point at infinity when a standard lens and a telephoto lens are respectively mounted on the camera. The manner in which the different diaphragms of the different interchangeable lenses are operatively associated with a camera where the photosensitive means is situated adjacent the pentaprism as well as with a camera where the photosensitive means is accommodated in the mirror box is described below.

Assuming that there is no diffusing surface in the photometric optical system of the invention, then the infinite light beams traveling through a standard lens and reaching the photosensitive means 9 would be limited only to a central portion thereof with respect to the light beams which travel beyond the objective, and the result would be not only an extremely spot-type of photometering operation but in addition a poor photosensitive efficiency. Thus, when a telephoto lens is mounted on the camera and there is no diffusing surface, the light beams passing through the telephoto lens will in part be incident upon the photosensitive element at a more acute angle than in the case of a standard lens inasmuch as the telephoto lens normally has a larger aperture ratio and longer focal length than a standard lens. As a result, the ratio of the amount of light incident upon the photosensitive element to the total amount of light traveling beyond the objective will be substantially greater with the telephoto lens than with a standard lens. By comparing a standard lens having, for example, an aperture ratio of F1.4 and a focal length of 50 mm. and a telephoto lens having an aperture of F4 and a focal length of 200 mm., the difference of the photometric output from the photosensitive element with the diaphragms of these lenses in the fully open position would be as great as approximately 1.8 EV if there is no diffusing surface in the photometric optical system. This output difference between such lenses is further increased to approximately 2.7 EV in the case where the light-measuring device of the camera has its photosensitive means situated adjacent the pentaprism. Thus, the difference resulting from using two different lenses of the above types with two different types of cameras can be as great as 1 EV, and this difference will result in a large photometric error.

However, by providing a diffusing surface in the optical system as referred to above, it will be seen, as shown in FIG. 4 that the light beams passing through the standard lens and then through the diffusing surface at the areas thereof defined between the points A and B as well as between the points C and D into the shaded zones are additionally incident upon the photosensitive element. It is to be noted that the zone defined between the point C and D is symmetrical to and the equivalent of the zone defined between the points A and B and represented by the shaded lines. Although it is clear that some of the light beams passing through the central area defined between the points B and C, as shown in FIG. 4, may stray beyond the effective surface of the photosensitive element under the influence of the diffusing surface, the peripheral area is substantially larger than the central area so that there is a total increase in the amount of light incident upon the photosensitive element.

On the other hand, in the case of the telephoto lens, the part of the light which passes through the central area of the diffusing surface that strays out beyond the effective surface of the photosensitive element is in excess of or corresponds to the light which after passing through the peripheral area of the diffusing surface is incident upon the photosensitive element. As a result, the extreme difference in photometric output with the diaphragms fully open, as mentioned above, between these two types of lenses can be reduced to such an extent, for example, as to be approximately 2.5 EV between the standard lens having the aperture ratio of F1.4 and the focal length of 50 mm and the telephoto lens having the aperture ratio of F4 and the focal length of 200 mm. Thus, it is apparent that even with a camera where the photosensitive element is accommodated in the mirror box, the photometric output difference with the fully open diaphragms, occurring between the two types of cameras, may be maintained on the order of 0.2 and 0.3 EV. Therefore, a good operative association characteristic of the diaphragms among the several interchangeable lenses of the various types is acheived. On the other hand, where the camera is of the type which has the photosensitive element adjacent the pentaprism, using lenses such as a Fresnel lens and a condenser lens will cause the light beams incident upon the photosensitive element to be more convergent than in the case of FIG. 4, and thus it is possible to avoid an extreme spot-type of photometric effect which otherwise would occur.

The extreme spot-type of photometric effect has often been conventionally encountered by cameras where the photosensitive element is accommodated in the mirror box. However, it is preferred to utilize the so-called central zone priority photometric system, particularly from the viewpoint of simplifying the mechanism and providing a more convenient operation. According to the present invention, the tendency toward extreme spot-type of photometric effects is reduced, and a photometric device of good central zone priority photometric operation is achieved by incorporating a suitable diffusing surface in the optical system so that the image is equalized by being uniformly distributed by the diffusing surface when subjected to the photometric function of the photosensitive element.

According to the embodiments of the invention shown in FIGS. 2 and 3, it is the front reflecting surface of the auxiliary mirror which has the light-diffusing property, rather than the rear surface of the semitransparent portion of the main mirror means. This type of construction is more advantageous in that the viewfinder image as seen by the operator is free of any possible influence of the diffusing surface portion of the main mirror means with the embodiment of FIG. 1. In the embodiment of FIG. 1 the light beams diffused by the diffusing surface are partially transmitted through the semi-transmissive film surface of the mirror 7 to the viewfinder means, and thus the diffused surface image is superimposed on the viewfinder image at a part of the latter. Disadvantages which may result from this latter type of operation are effectively eliminated with the embodiments of FIGS. 2 and 3.

The size of the auxiliary mirror means which is used for photometric purposes is restricted by the space which is available within the mirror box, although the larger the auxiliary mirror means the greater the effect of the central zone priority photometric system. In view of this factor, it is not possible to provide auxiliary mirror means 10 and 12, shown in FIGS. 2 and 3, respectively, for photometric purposes with an excessively large size relative to the space which is available within the mirror box. The auxiliary mirror means 12 indicated in FIG. 3 has a front concave reflecting surface, which may form part of a sphere or which may be non-spherical or part of a cylinder. Thus, in the case of FIG. 2 it is the front flat reflecting surface of the auxiliary mirror means 10 which has the light diffusing property for directing the light in a diffused condition to the photosensitive means 9, while in the embodiment of FIG. 3 it is the concave front reflecting surface of the auxiliary mirror means 12 which has the light-diffusing property for directing diffused light to the photosensitive means 9.

In order to accommodate an auxiliary mirror means 6, 10, or 12 for photometric purposes which is as large as possible within the mirror box which is limited dimensionally, it is preferable to dispose the auxiliary mirror means for photometric purposes at an attitude which is as closely as possible in a vertical plane. For this purpose the photosensitive element 9 is situated at the bottom of the mirror box as close as possible to the objective means 1. However, the position of the photosensitive means 9 cannot be directly next to the objective means 1 inasmuch as the main mirror means 11 in the case of FIGS. 2 and 3 and 7 in the case of FIG. 1 must be situated closer to the objective means than the photosensitive means 9. Therefore, the optimum arrangement in practice is to situate the auxiliary mirror means and the photosensitive means in such a way that the light is reflected by the auxiliary mirror means along a predetermined path which is parallel to the main mirror means and along which the photosensitive means 9 is situated, as illustrated in FIGS. 1–3.

According to a further feature of the invention a condenser lens means 8 is situated in front of the photosensitive means 9, in the path of travel of light thereto from the auxiliary mirror means, for the purpose of improving the photosensitive efficiency of the photosensitive means and reducing the tendency peculiar to a photometering device of the type illustrated toward spot photometric effects. Thus, the condenser lens means 8 forms a lens system which is adapted to focus a diffused image of the photometric optical system substantially over the entire effective surface of the photosensitive means 9.

Thus, in the embodiment of FIGS. 2 and 3, the front surface of the main mirror means 11 is in the form of a semi-transmissive film surface while the rear surface is in the form of a transmissive plain surface, as distinct from the diffusing rear surface portion of the main mirror means 7 of FIG. 1.

As is apparent from the above, by way of the present invention it is possible to provide an improved photometric device wherein the photosensitive means is accommodated within the mirror box to obtain for a single lens reflex camera a highly systematized range of operation according to which different types of lenses may effectively be used with the possibility of providing a high degree of interchangeability between various viewfinder optical systems, without detracting from the effectiveness of the operation of the camera. A good operative association of the different diaphragms is thus achieved by way of the present invention, and therefore it is possible to provide automatic exposures without errors even in the case where the same interchangeable lenses are used either with a camera where the photosensitive means is situated adjacent the pentaprism or with a camera as illustrated where the photosensitive means is in the mirror box. In addition, by way of the present invention it is possible to provide a photometric device which is of the central zone priority photometric type so that simplicity of the structure and convenience in the operation thereof are maintained.

It will be apparent to those skilled in the art that while the invention has been described above in connection with certain presently preferred embodiments, changes, modifications and alterations may be made without departing from the scope of the invention.

What is claimed is:

1. In a single lens reflex camera, objective means forming one of a plurality of objective means respectively having different focal lengths and adapted to be used interchangeably, said objective means having an optical axis along which light travels through said objective means into the camera, main mirror means situated behind said objective means and viewfinder means situated above said main mirror means, said main mirror means reflecting light which has traveled through said objective means to said viewfinder means, and said main mirror means having a semitransparent portion through which part of the light which has traveled through said objective means passes, auxiliary mirror means situated behind said semitransparent portion of said main mirror means for receiving the part of the light which passes through said semitransparent portion of said main mirror means, said auxiliary mirror means reflecting the light received thereby along a predetermined path, and photosensitive means situated along said path for receiving the light reflected by said auxiliary mirror means and for participating in the measurement thereof, said main mirror means having at said semitransparent portion thereof a front surface from which light is reflected to said viewfinder means and an opposed rear surface beyond which light travels to said auxiliary mirror means and said auxiliary mirror means having a reflecting surface which directs the light along said predetermined path to said photosensitive means, said rear surface of said main mirror means and said reflecting surface of said auxiliary mirror means forming a pair of surfaces one of which has the property of diffusing light, so that said photosensitive means receives diffused light, reflected from said auxiliary mirror means, for reducing the difference in the operation of said photosensitive means with respect to a plurality of objective means of different focal lengths.

2. The combination of claim 1 and wherein said rear surface of said main mirror means has said light-diffusing property.

3. The combination of claim 1 and wherein said reflecting surface of said auxiliary mirror means has said light-diffusing property.

4. The combination of claim 3 and wherein said light-diffusing reflecting surface of said auxiliary mirror means is flat.

5. The combination of claim 3 and wherein said light-diffusing reflecting surface of said auxiliary mirror means is concave.

6. The combination of claim 1 and wherein a condenser lens means is situated along said path in advance of said photosensitive means.

7. The combination of claim 1 and wherein said path extends from said auxiliary mirror means to said photosensitive means along a straight line which is parallel to said main mirror means.

* * * * *